United States Patent
Kaplan

(10) Patent No.: US 6,684,066 B1
(45) Date of Patent: *Jan. 27, 2004

(54) CALL TIMERS SPECIFIC TO EACH TYPE OF CELLULAR TELEPHONE CALL

(75) Inventor: Diego A. Kaplan, San Diego, CA (US)

(73) Assignee: Qualcomm, Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/489,598

(22) Filed: Jan. 20, 2000

(51) Int. Cl.$^7$ .............................................. H04M 11/00
(52) U.S. Cl. ..................... 455/405; 455/565; 455/411; 455/550; 455/410; 379/88.23; 379/88.25; 379/93.02; 379/201.01
(58) Field of Search ................................ 455/565, 405, 455/411, 550, 410, 462, 9, 17; 379/201, 111, 93.02, 88.23, 88.25, 196, 197, 201.01, 114.01, 115.01

(56) References Cited

U.S. PATENT DOCUMENTS

| | | | | |
|---|---|---|---|---|
| 4,658,096 A | * | 4/1987 | West et al. ................... | 455/422 |
| 5,475,743 A | * | 12/1995 | Nixon et al. ............ | 379/114.15 |
| 5,815,807 A | * | 9/1998 | Osmani et al. .............. | 455/407 |
| 6,085,084 A | * | 7/2000 | Christmas .................... | 455/411 |
| 6,088,437 A | * | 7/2000 | Amick ................... | 379/211.02 |
| 6,101,242 A | * | 8/2000 | McAllister et al. .... | 379/201.02 |
| 6,122,357 A | * | 9/2000 | Farris et al. ........... | 379/201.02 |

* cited by examiner

*Primary Examiner*—Lee Nguyen
*Assistant Examiner*—Marceau Milord
(74) *Attorney, Agent, or Firm*—Philip R. Wadsworth; Charles D. Brown; Howard H. Seo

(57) ABSTRACT

Systems and methods for tracking the length of time spent by a user on different types of transmissions from a wireless communication device are disclosed. The systems include a keypad that is operated by a user to generate keypad data indicative of a destination telephone number. The systems also include a storage area for storing data related to the calling plan. The data is stored in the storage area by a processor in the form of a state data table that indicates the present machine state of the wireless communications device. The present machine state of the device is updated in response to each entry of keypad data, and is indicative of the type of call that would be originated if the keypad data string were processed as a call at that moment. The systems also include a call timer that is initiated when a complete telephone number has been entered by the user and the telephone call is originated. The system also includes various memory locations wherein the cumulative total length of time spent on specific types of telephone calls are stored. A display may also be provided to allow the user to view how much time has been spent on each type of telephone call.

25 Claims, 5 Drawing Sheets

| 230 ↙ | | | | 302 | | | | | | | 306 |
|---|---|---|---|---|---|---|---|---|---|---|---|
|  | 0 | 1 | 2 | 3 | 4 | 5 | 6 | 7 | 8 | 9 |  |
| 1 | 2 | 3 | 4 | 4 | 4 | 4 | 4 | 4 | 4 | 4 | 1AH |
| 2 |  | I | 5 |  |  |  |  |  |  |  | 02H |
| 3 |  | I | I | 6 | 6 | 6 | 6 | 6 | 6 | 6 | 01H |
| 4 | 7 | 7 | 7 | 7 | 7 | 7 | 7 | 7 | 7 | 7 | 1CH |
| 5 |  | 8 |  |  |  |  |  |  |  |  | 02H |
304 ↓
FIG. 3
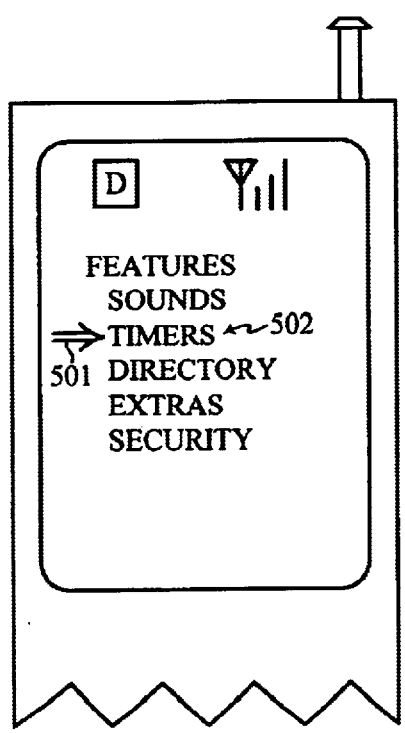
FIG. 5A
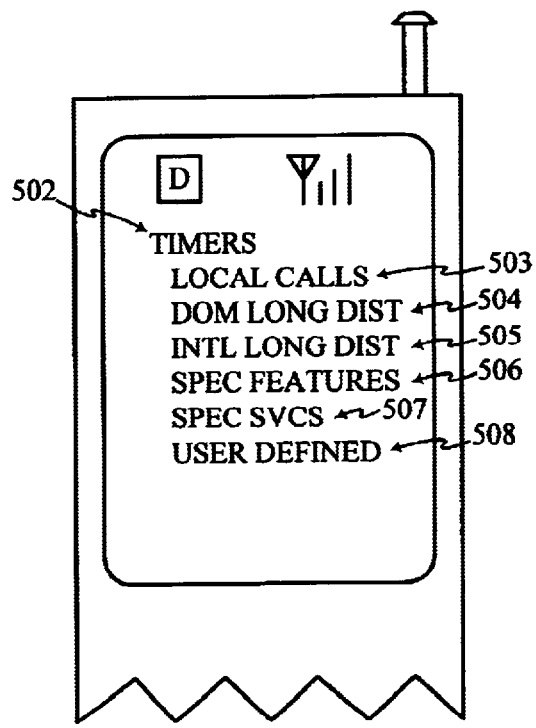
FIG. 5B

CALL TIMERS SPECIFIC TO EACH TYPE OF CELLULAR TELEPHONE CALL

BACKGROUND

I. Field of the Invention

The present invention relates to wireless communication devices in general, and to a method and apparatus for displaying the amount of time spent on specific types of calls originated from a wireless communication device in particular.

II. Description

Wireless communication devices, such as cellular telephones, are widely used as a replacement for conventional telephone systems. With a wireless communication device, a user may place local, long distance or international telephone calls without the need for physical connection between the wireless communication device and a central switching office, such as a public switched telephone network (PSTN).

Each country has specific telephone number assignments and rules for dialing telephone numbers within that country. These pre-designated rules are referred to herein as dialing rules or plans. For example, the United States uses seven digits to represent a local exchange and telephone number. To place a long distance call within the United States, the user must dial a 1, followed by the destination area code and telephone number. Thus, it can be seen that the dialing plan for the United States require a predetermined sequence of digits for local calls, domestic long distance calls and international long distance calls. It should be noted that countries other than the United States typically use a different dialing plan.

U.S. Pat. No. 5,884,193, entitled SYSTEM AND METHOD FOR CALL RESTRICTION IN A WIRELESS COMMUNICATION DEVICE, assigned to the assignee of the present invention and incorporated fully herein by reference, discloses and describes a system and method for controlling transmissions from a wireless communication device. The system uses a pre-designated calling plan and an enable signal having enabled and disabled states to selectively enable call origination form the wireless communication device. A keypad is provided for through which a user generates keypad data indicative of a destination telephone number. The system also includes a storage area for storing data related to the calling plan. A processor accepts and uses keypad data to access the data storage area. The data may be stored in the storage area in the form of a state data table indicative of a present machine state of the wireless communication device. The present state of the device is altered in response to each entry of keypad data by a user.

In many instances, a wireless communications device user is charged a different amount of money per minute by a wireless communication service provider for each type of call, local, domestic long distance, international long distance, etc., originated from his wireless communication device. It is known to provide timers for tracking the length of an incoming or outgoing call on a wireless communication device, as well as cumulative timers for tracking the total length of all calls received or originated from the wireless communication device for various periods of time. These timers do little however, to help a user track the number of minutes spent on each type of call and the likely cost of those calls.

Accordingly, there is a need to provide users of wireless communication devices some means of tracking the amount of time that has been spent on different types of telephone calls.

SUMMARY OF THE INVENTION

The present invention is embodied in a system and method to track the length of time spent by a user on different types of transmissions from a wireless communication device to a central controller. The system includes a keypad that is operated by a user to generate keypad data indicative of a destination telephone number. The system also includes a storage area to store data related to the calling plan. Data is stored in the storage area by a processor in the form of a state data table that indicates the present machine state of the wireless communications device. The present machine state of the device is updated in response to each entry of keypad data, and is indicative of the type of call that would be originated if the keypad data string was processed as a call at that moment. The system also includes a call timer that is initiated when a complete telephone number has been entered by the user and the telephone call is originated. Finally, the system includes various memory locations wherein the cumulative total length of time spent on specific types of telephone call is stored. Preferably, a display is provided to allow the user to view how much time has been spent on each type of telephone call.

BRIEF DESCRIPTION OF THE DRAWINGS

The features, objects and advantages of the present invention will become more apparent from the detailed description set forth below when take in conjunction with the drawings, in which like reference characters identify correspondingly throughout and wherein:

FIG. 3 is a portion of a data table for the state diagram of FIG. 2 illustrating the storage of data relating to dialing rules.

FIGS. 5A and 5B illustrate an exemplary portion of the wireless communications device in FIG. 1 for viewing the values in each of the specific call type memory locations as updated and tracked according to the flowchart of FIG. 4.

DETAILED DESCRIPTION OF THE PREFERRED EMBODIMENT

Figure 1:
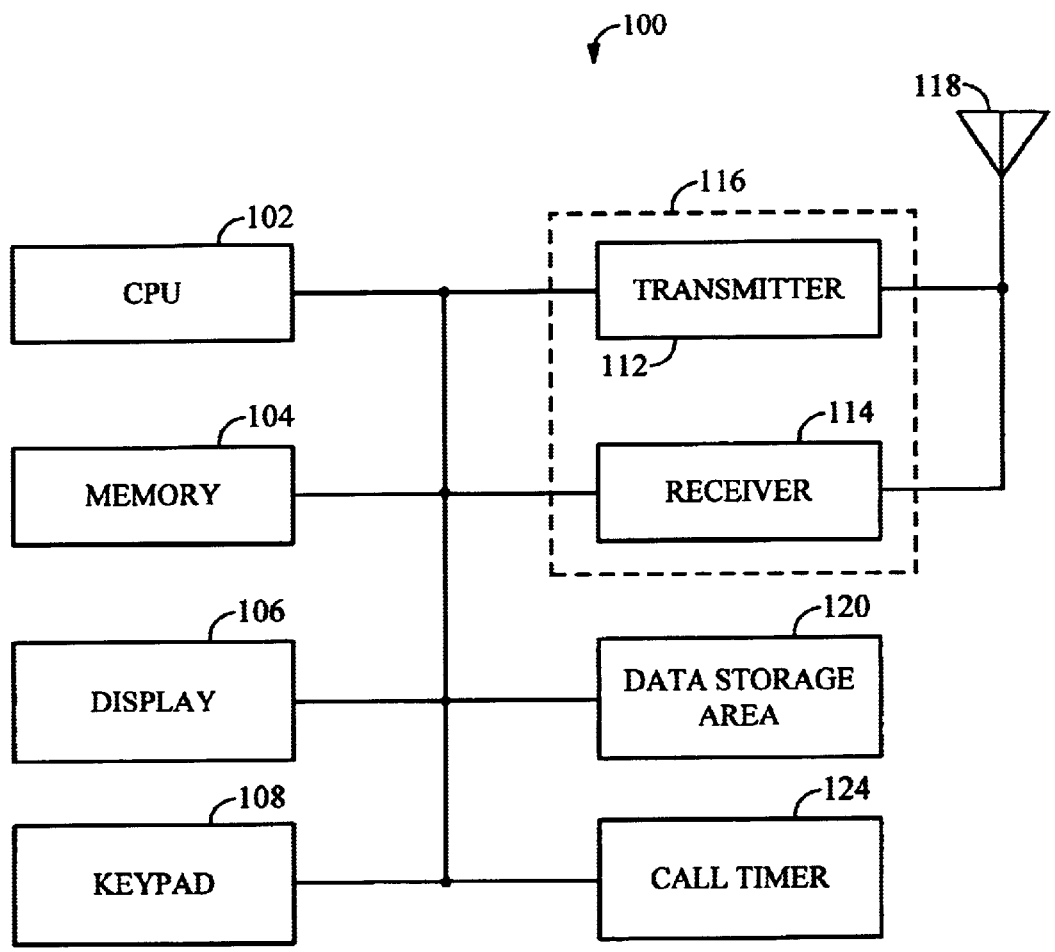
FIG. 1 is a functional block diagram of a wireless communications device designed in accordance with the principles of this invention.

The present invention is embodied in a system 100, illustrated in the functional block diagram of FIG. 1. The system 100 can be readily implemented by any wireless communication device, such as a cellular telephone, personal communication system (PCS) device, wireless local loop (WLL) telephone, or the like. For the sake of clarity though, the following paragraphs describe an implementation of the system 100 in a cellular telephone. The system 100 advantageously processes the length of the various telephone calls originated from the wireless communication device within the device itself, rather than rely on processing at a cell site controller (not shown).

The system 100 includes a CPU 102 and a memory 104, which may include both read-only memory and random access memory. Included in memory 104 are a number of specific call type memory locations, comprising some or all of the following, Local Calls Memory, Domestic Long Distance Calls Memory, International Long Distance Calls Memory, Special Services Calls Memory, Special Features Calls Memory, and/or User Defined Calls Memory. Special Services Calls include but are not limited to directory assistance calls, Weather Report Calls, and/or Time Calls. Specials Features Calls include but are not limited to Activate/Deactivate Features Calls, and/or Customer Service Calls. User Defined Calls may include but are not limited to Toll-Free Calls, 976 Prefix Calls, and/or calls to specific country codes. Other specific call type memory locations may be provided to account for other types of calls. In addition, the specific call type memory locations may be implemented in a memory location apart from memory 104. The system 100 may optionally include display 106, which may be a liquid crystal display (LCD). The system 100 may however, be implemented in a cellular telephone or other wireless communication device that has no display. The system 100 also includes a keypad 108. A transmitter 112 and receiver 114 allow transmission and reception of data, such as audio communications, between the system 100 and a remote location, such as a cell site controller (not shown). The transmitter 112 and receiver 114 may be combined into a transceiver 116. An antenna 118 couples radio frequency signal between the system 100 and a cell site controller.

As is well known to those having ordinary skill in the art, wireless communications devices, such as cellular telephones, transmit a call origination message from the transmitter 112 to a cell site controller (not shown). At the end of the dialing process, the call origination message is transmitted in accordance with an industry standard format. In a preferred embodiment, the CPU generates the call origination message in response to user input at keypad 108.

Also included in system 100 is a data storage area 120 which contains data related to one or more calling plans for different countries. As will be described in detail below, the data storage area 120 may be considered a state table containing data indicative of all relevant dialing states of the system 100. The data storage area may be part of the memory 104 or a separate storage device, such as a programmable read-only memory.

Figure 2:
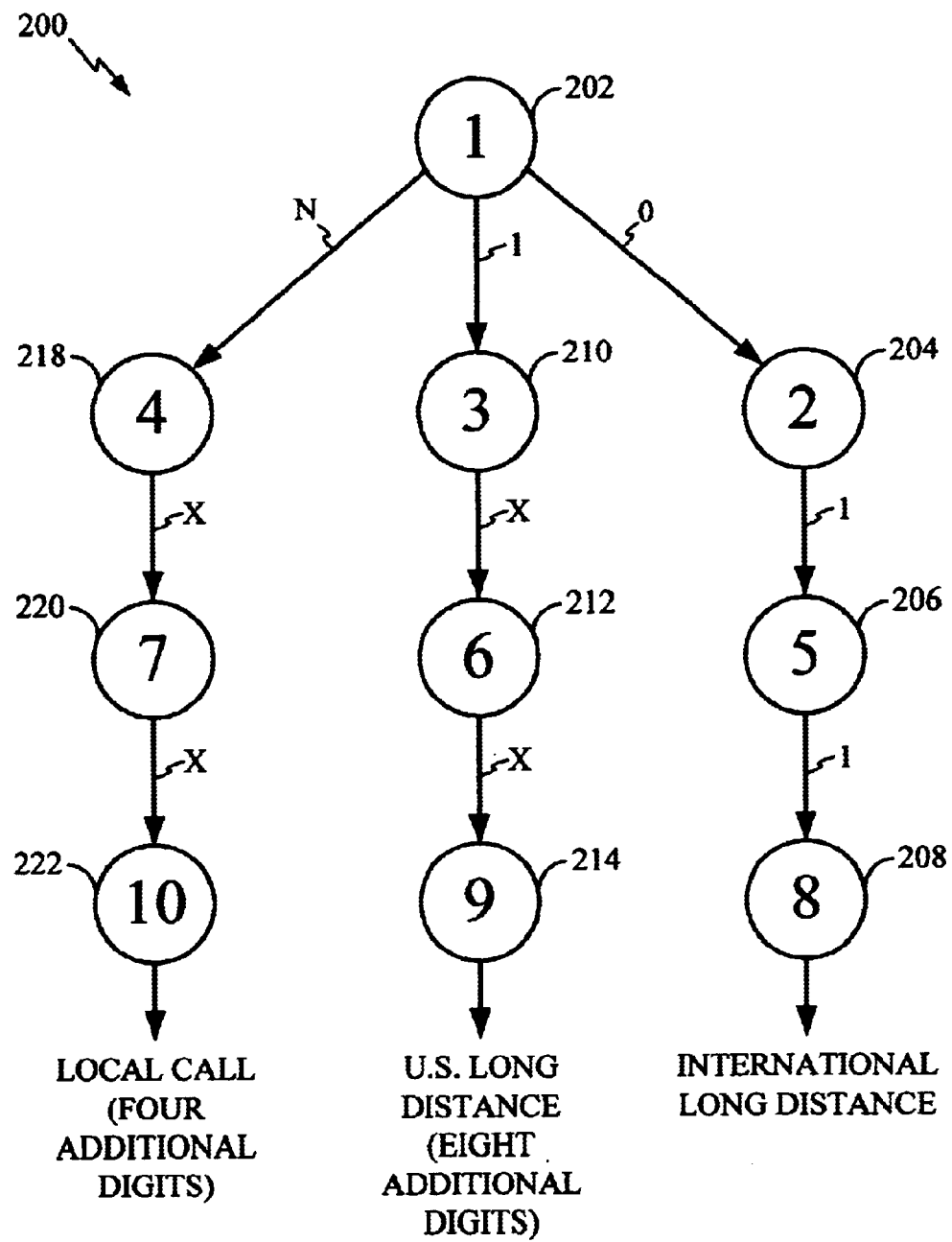
FIG. 2 illustrates selected portions of an exemplary state diagram implementing dialing rules for the United States.

Also included in system 100 is a Call Timer 124 which is initiated by CPU 102 as described in detail below and tracks the length of each call originated from system 100 to a central controller, such as a cell site controller. Those having skill in the art will recognize that many known timers, both hardware and/or software in design, are suitable for Call Timer 124. Therefore, a detailed description of the particular selection, implementation and operation of Call Timer 124 will not be undertaken herein. A user controls communication between the system 100 and a central controller, such as a cell site controller, using keypad 108. As each keystroke is entered by the user, system 100 enters a machine state, illustrated by a state diagram 200 shown in FIG. 2. The system 100 begins at an initial state, State 1, indicated by the reference numeral 202 prior to the user entering any digits on keypad 108. The first digit entered by the user on keypad 108 causes the system 100 to change from State 1 202 to a different state, the particular state depending on the value of the digit entered on keypad 108. If the user enters a 0 on keypad 108, the system 100 changes to State 2, denoted by reference numeral 204. From State 2 204, the user enters additional digits on keypad 108 that cause system 100 to change states as each digit is entered. As illustrated in FIG. 2, if the user enters a 1, the system 100 changes from State 2 204 to State 5 206. If the user enters an additional 1 while in State 5 206, system 100 changes to State 8 208, indicating the user's intention to place an international long distance call by entering the prefix sequence (0+1+1). As can be appreciated by those having ordinary skill in the art, a user will enter additional digits indicative of a country code, city code, telephone number and the like. The specific sequence of digits entered by the user depends on the destination telephone number and, therefore, need not be described herein.

From State 1 202, the user can enter a 1 on keypad 108 causing system 100 to change to State 3 210. The entry of any subsequent digit X, X being in the range 0 to 9, causes system 100 to change from State 3 210 to a State 6 212. The entry of any subsequent digit 0 through 9, indicated by the reference X, causes system 100 to change from State 6 212 to State 9 214. The entry of additional digits from State 9 214 would be indicative of a U.S. long-distance call. As those having ordinary skill in the art will appreciate, the entry of 8 additional digits is required to complete a U.S. long-distance call if system 100 is at State 9 214, so that the sequence of all digits entered is of the form (1+area code+ telephone number).

From State 1 202, the entry of any digit N, with N being in the range 2 through 9, causes the system to change to State 4 218. The subsequent entry of any digit X (i.e., 0–9) causes system 100 to change from State 4 218 to State 7 220. As illustrated in FIG. 2, the entry of additional digits is indicative of a U.S. local call. As can be appreciated by those having ordinary skill in the art, a total of 7 digits, beginning with the digit N, is indicative of a U.S. local call. Thus, each entry on keypad 108 causes system 100 to change machine states.

It should be noted that the state diagram 200 of FIG. 2 is merely a portion of an exemplary calling plan applicable to the United States. The present invention is not however, limited to the United States calling plan and may be programmed by one having ordinary skill in the art, as indicated below, to customize the state diagram to any calling plan of any country. Furthermore, it should be noted that for simplicity, many states and branches are not illustrated. For example, special services such as local information (411) and local emergency (911) are not illustrated as separate states, nor are operator-assisted calls that begin with the digit "0", because a designer may opt to treat these special services differently. Additionally, invalid call dialing states have been omitted for ease of illustration.

The state diagram 200 is readily stored in the data storage area 120 in the form of a data table 230 illustrated in FIG. 3. While shown in FIG. 3 as the data table 230, those having ordinary skill in the art will recognize that any suitable data structure may be used to store the data corresponding to the state diagram 200. The present invention is not limited by the specific form of data structure used to store data corresponding to state diagram 200.

Each state of state diagram 200 is used an index to data table 230. At each state corresponding to row index 304, the user may enter a digit X (i.e., 0–9) which corresponds to column index 302. The entry of a digit points to a specific location in data table 230, the value in that specific location indicating the next state of system 100. In addition, data table 230 contains in column 306, data indicative of the specific type of call under the applicable dialing plan (in this case the United States) while the system is in that state. As will be described in detail below, data table 230 includes one byte of call type data in column 306 for each state of system 100. The call type data byte in data table 230 indicates the specific type of call that would be originated by system 100 in the present machine state. For example, if the user enters digits 0+1, placing system 100 in State 5 206, under the U.S. calling plan only an international long distance call may be originated from that state, corresponding to hexadecimal symbol 02H in column 306. Thus, the call type data byte in column 306 of data table 230 provides an indication of the specific type of call that would be originated by system 100 in the present machine state.

It should be noted that state diagram 200 in FIG. 2 and data table 230 in FIG. 3 do not illustrate each possible machine state of system 100. The number of possible machine states will depend on the specific calling plan implemented in the country in which system 100 is operated. For the sake of brevity, only a limited number of machine states are illustrated in FIGS. 2 and 3. In addition, it is possible to enter digit sequences on keypad 108 that result in inoperable or illegal machine states. For example, if system 100 is in State 3 210, the entry of the digit 0 or 1 on keypad 108 results in an illegal machine state. Therefore, the data entries illustrated in data table 230 indicate that system 100 is in an illegal state and the present call attempt is terminated, with an appropriate alert displayed on display 106 or an alert tone played through a speaker (not shown). Details on the use of data tables to store calling plans are provided in U.S. Pat. No. 5,812,651 entitled "TELEPHONE NUMBER PARSER FOR WIRELESS LOCAL LOOP TELEPHONES", assigned to the assignee of the present invention and fully incorporated herein by reference. It should also be noted that the present invention may be implemented in conjunction with the system and method disclosed in U.S. Pat. No. 5,844,193 entitled SYSTEM AND METHOD FOR CALL RESTRICTION IN A WIRELESS COMMUNICATION DEVICE and assigned to the assignee of the present invention.

In a cellular telephone, the user typically depresses a SEND button (not shown) on keypad 108 to originate a call. Alternatively, system 100 may be implemented in a manner where the user may not be required to press a SEND button, or some equivalent thereof, in order to originate a call (e.g., a WLL telephone system). When system 100 is in a final machine state, such as when the user depresses the SEND button (not shown) or when a dialing timer times out, the CPU 102 processes the telephone number and originates the call.

Figure 4:
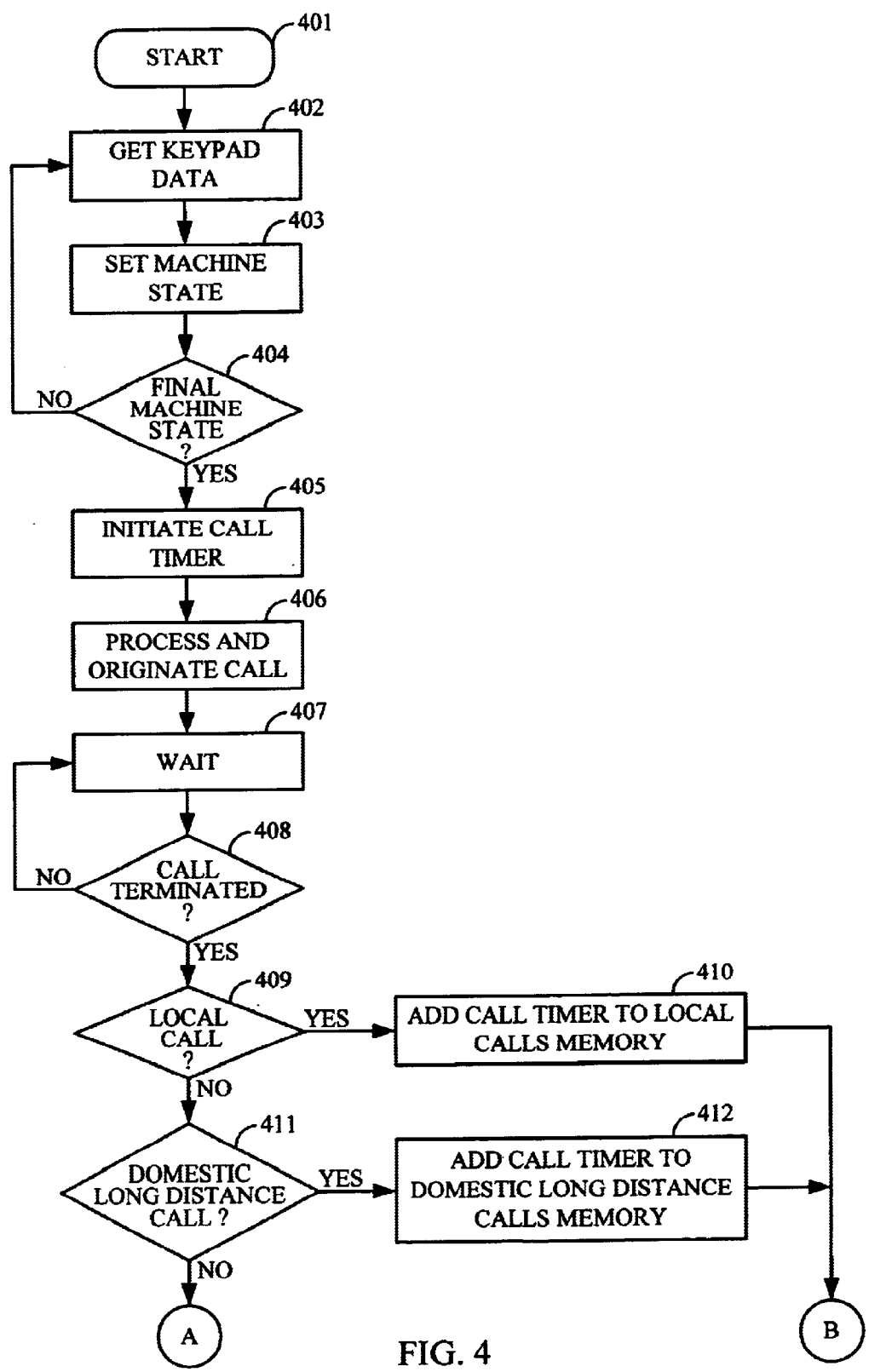
FIG. 4 is a flowchart illustrating the operations of the wireless communications device in FIG. 1.
Figure 4:
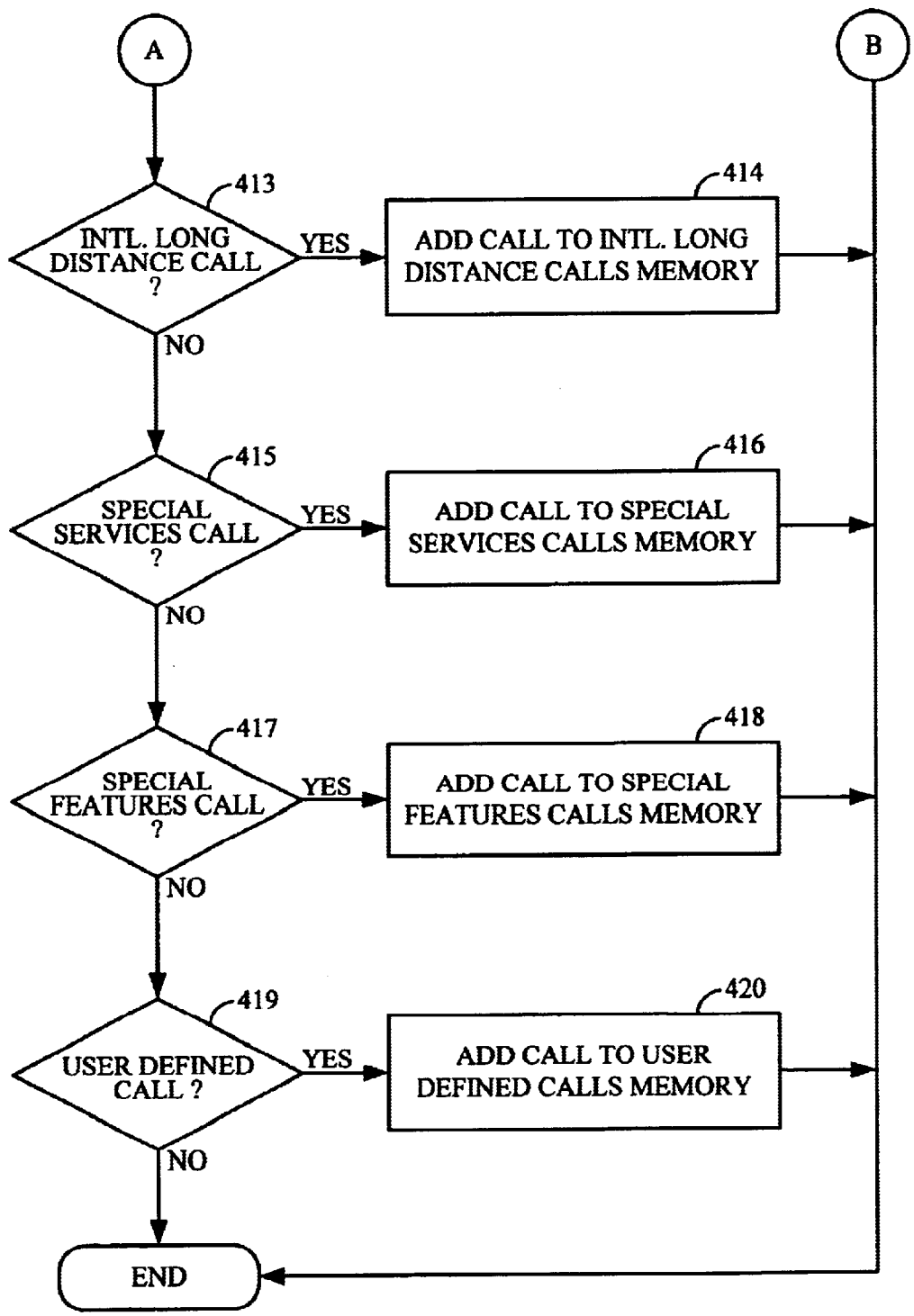

A flowchart of the operation of system 100 is illustrated in FIG. 4. At a start 401, system 100 is in State 1 202 (see FIG. 2). In step 402 system 100 receives keypad data from keypad 108 in response to user entry of a digit. Based on the user entered digit, system 100 enters a new machine state in step 403. In decision step 404 CPU 102 (see FIG. 1) determines whether system 100 is in a final machine state. If the result of the determination in step 404 is a NO, system 100 returns to step 402 to retrieve additional keypad data from keypad 108. If the result of the determination in step 404 is a YES, CPU 102 initiates Call Timer 124 in step 405, processes and originates the call in step 406 and proceeds to step 407. In step 407, CPU 102 waits for some predetermined period of time before proceeding to determine in step 408 whether the originated call is over. The exact period of time is not critical, but should be fairly short to ensure that an accurate measure of the length of the call is obtained. Once the waiting period has expired, CPU 102 determines in step 408 whether the call has been terminated. If the result of the determination in step 408 is NO, system 100 returns to step 407 and waits for some predetermined period of time before checking to see if the call has been terminated again. If the result of the determination in step 408 is YES, CPU 102 determines in step 409 whether call type data byte 306 (see FIG. 3) indicates that a local call was originated in step 406. If the result of the determination in step 409 is YES, CPU 102 adds in step 410 the Call Timer 124 value to the current value in Local Calls Memory and saves the sum as the new Local Calls Memory value. If the result of the determination in step 409 is NO, CPU 102 determines in step 411 whether call type data byte 306 indicates that a domestic long distance call was originated in step 406. If the result of the determination in step 411 is YES, CPU 102 adds in step 412 the Call Timer 124 value to the current value in Domestic Long Distance Calls Memory and saves the sum as the new Long Distance Calls Memory value. If the result of the determination in step 411 is NO, CPU 102 determines in step 413 whether call type data byte 306 indicates that an international long distance call was originated in step 406. If the result of the determination in step 413 is YES, CPU 102 adds in step 414 the Call Timer 124 value to the current value in International Long Distance Calls Memory and saves the sum as the new International Long Distance Calls Memory value. If the result of the determination in step 413 is NO, CPU 102 determines in step 415 whether call type data byte 306 indicates that a special services call, such as a call to directory assistance, was originated in step 406. If the result of the determination in step 415 is YES, CPU 102 adds in step 416 the Call Timer 124 value to the current value in Special Services Calls Memory and saves the sum as the new Special Services Calls Memory value. If the result of the determination in step 415 is NO, CPU 102 determines in step 417 whether call type data byte 306 indicates that a special features call was originated in step 406. If the result of the determination in step 417 is YES, CPU 102 adds in step 418 the Call Timer 124 value to the current value in Special Features Calls Memory and saves the sum as the new Special Features Calls Memory value. If the determination in step 417 is NO, CPU 102 determines in step 419 whether call type data byte 306 indicates that a user defined call was originated in step 406. If the determination in step 419 is YES, CPU 102 adds in step 420 the Call Timer 124 value to the current value in User Defined Calls Memory and saves the sum as the new User Defined Calls Memory value. If the determination in step 419 is NO, CPU 102 ends the analysis at step 419 and does not add the Call Timer 124 value to any specific call type memory location. It will be appreciated by those having skill in the art that additional analysis steps accounting for other specific types of calls could be added and are within the scope of the present invention. Furthermore, the specific types of calls, the labels used to refer to those types of calls, and the actual number of specific types of calls implemented by a designer in any particular embodiment of the present invention may vary as well.

Referring now to FIGS. 5A and 5B, there is shown an exemplary portion of system 100 for viewing the values in each of the specific call type memory locations in accordance with the embodiment of the present invention illustrated in FIG. 4. Having accessed a FEATURES subdirectory via a prior display (not shown), the user is presented with a number of choices, one being a TIMERS subdirectory 502. Upon selecting TIMERS subdirectory 502 with pointer 501, the user is presented with a further subdirectory comprising the specific call type memory locations, LOCAL CALLS 503, DOM LONG DIST 504, INTL LONG DIST 505, SPEC FEATURES 506, SPEC SVCS 507, and USER DEFINED 508, that are tracked in system 100 and may be viewed by the user via display 108. Selecting LOCAL CALLS 503 with pointer 501 allows the user to view the value of Local Calls Memory, representing the cumulative amount of time spent on local calls. Selecting DOM LONG DIST 504 with pointer 501 allows the user to view the value of Domestic Long Distance Calls Memory, representing the cumulative amount of time spent on domestic long distance calls. Selecting INTL LONG DIST 505 with pointer 501 allows the user to view the contents of International Long Distance Calls Memory, representing the cumulative amount of time spent on international long distance calls. Selecting SPEC FEATURES 506 with pointer 501 allows the user to view the contents of Special Features Calls Memory, representing the cumulative amount of time spent on special features calls, such as directory assistance calls. Selecting SPEC SVCS 507 with pointer 501 allows the user to view the contents of Special Services Calls Memory, representing the cumulative amount of time spent on special services calls. Selecting USER DEFINED 508 with pointer 501 allows the user to view the contents of User Defined Calls Memory, representing the cumulative amount of time spent on user defined calls.

One skilled in the art will appreciate that each of the subdirectories under the TIMERS subdirectory 502, such as the SPEC FEATURES 506, SPEC SVCS 507, and USER DEFINED 508 subdirectories, may have further subdirectories dedicated to the specific types of calls within those subdirectories. For example, SPEC FEATURES subdirectory 506 could have subdirectories dedicated to directory assistance and/or weather report calls and USER DEFINED subdirectory 508 could have subdirectories dedicated to toll-free calls and/or calls to specific country codes. It will be further appreciated by those having skill in the art that methods of accessing the specific call type memory locations, the particular format in which they are presented, the order of presentation, etc., other than those illustrated and described above may be utilized and are within the scope of the present invention. In addition, system 100 may be implemented in a manner allowing the user to periodically reset the values in the specific call type memory locations if the user so desires. For example, the user may wish to reset the values in the specific call type memory locations at the conclusion of each telephone service billing period.

The previous description of the preferred embodiments is provided to enable any person skilled in the art to make or use the present invention. The various modifications to these embodiments will be readily apparent to those skilled in the art, and the generic principles defined herein may be applied to other embodiments without the use of inventive faculty. Thus, the present invention is not intended to be limited to the embodiments shown herein but is to be accorded the widest scope consistent with the principles and novel features disclosed herein.

That which is claimed is:

1. A system for tracking the amount of time spent on specific types of calls originated from a wireless communications device to a central controller having a dialing plan, said system comprising:

a transmitter for transmitting data from said wireless communications device to said central controller;

a keypad operable by a user for generating keypad data;

a storage area for storing a state table indicative of a present machine state of said wireless communication device, said present machine state being altered in response to each entry of keypad data, and for storing data indicative of the amount of time spent on specific types of calls originated from said wireless communications device;

a timer for tracking the length of each call originated from said wireless communications device; and a processor for determining the specific type of calls originated from said wireless communications device and for generating said data indicative of the amount of time spent on specific types of calls.

2. The system of claim 1 wherein said specific types of calls tracked comprises local calls.

3. The system of claim 1 wherein said specific types of calls tracked comprises domestic long distance calls.

4. The system of claim 1 wherein said specific types of calls tracked comprises international long distance calls.

5. The system of claim 1 wherein said specific types of calls tracked comprises special services calls.

6. The system of claim 1 wherein said specific types of calls tracked comprises special features calls.

7. The system of claim 1 wherein said specific types of calls tracked comprises user defined calls.

8. The system of claim 1 wherein said wireless communications device comprises a cellular telephone.

9. The system of claim 1 wherein said processor determines said specific type of calls originated from said wireless communications device by analyzing a call type data byte.

10. The system of claim 9 wherein said call type data byte comprises an 8-bit storage area of said state table.

11. The system of claim 1 wherein said dialing plan comprises the United States dialing plan.

12. The system of claim 1 comprising the additional element of a display for viewing said data indicative of the amount of time spent on specific calls.

13. The system of claim 12 wherein said display comprises a liquid crystal display.

14. A method of tracking the amount of time spent on specific types of calls originated from a wireless communications device to a central controller having a dialing plan, comprising the steps of:

(A) generating keypad data in response to keypad entries;

(B) storing a state table indicative of a present state of said wireless communications device, said present state being altered in response to each entry of keypad data;

(C) initiating a call timer in response to a final machine state;

(D) determining the specific type of call originated from said wireless communications device from said final machine state; and (E) adding the value of said call timer to the present value of a memory location dedicated to said specific type of call following the termination of said specific type of call.

15. The method of claim 14 wherein said specific types of calls tracked comprises local calls.

16. The method of claim 14 wherein said specific types of calls tracked comprises domestic long distance calls.

17. The method of claim 14 wherein said specific types of calls tracked comprises international long distance calls.

18. The method of claim 14 wherein said specific types of calls tracked comprises special services calls.

19. The method of claim 14 wherein said specific types of calls tracked comprises special features calls.

20. The method of claim 14 wherein said specific types of calls tracked comprises user defined calls.

21. The method of claim 14 wherein said wireless communications device comprises a cellular telephone.

22. The method of claim 14 wherein said dialing plan comprises the United States dialing plan.

23. The method claim 14 wherein said state table includes a call type data byte.

24. The method of claim 23 wherein said call type data byte comprises an 8-bit storage area of said state table.

25. An apparatus for tracking the amount of time spent on specific types of calls originated from a wireless communications device to a central controller having a dialing plan, comprising:

(A) a keypad for generating keypad data in response to keypad entries;

(B) means for generating a state table indicative of a present state of said wireless communications device operatively connected to said keypad, said present state being altered in response to each entry of keypad data;

(C) means for storing said state table operatively connected to said means for generating;

(D) means for timing a call in response to a final machine state operatively connected to said keypad and said means for generating;

(E) means for determining from said final machine state the specific type of call originated from said wireless communications device operatively connected to said means for generating and said means for storing; and (F) means for adding the value of said means for timing to the present value of a memory location dedicated to said specific type of call following the termination of said specific type of call, said means for adding operatively connected to said means for timing and said means for determining.

* * * * *